United States Patent
Derr et al.

(10) Patent No.: US 6,453,375 B1
(45) Date of Patent: Sep. 17, 2002

(54) METHOD AND APPARATUS FOR OBTAINING COHERENT ACCESSES WITH POSTED WRITES FROM MULTIPLE SOFTWARE DRIVERS

(75) Inventors: Michael N. Derr, Folsom; Karthi R. Vadivelu, Fair Oaks, both of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/275,361

(22) Filed: Mar. 23, 1999

(51) Int. Cl.[7] .............................................. G06F 12/00
(52) U.S. Cl. ...................................... 710/200; 710/240
(58) Field of Search ................................ 710/240–244, 710/200

(56) References Cited

U.S. PATENT DOCUMENTS

| | | | |
|---|---|---|---|
| 4,104,718 A | * 8/1978 | Poublan et al. | |
| 4,805,106 A | * 2/1989 | Pfeifer | |
| 5,003,463 A | * 3/1991 | Coyle et al. | |
| 5,050,072 A | * 9/1991 | Earnshaw et al. | |
| 5,261,106 A | * 11/1993 | Lentz et al. | |
| 5,293,491 A | * 3/1994 | Leung et al. | |
| 5,353,416 A | * 10/1994 | Olson | |
| 5,369,748 A | * 11/1994 | McFarland et al. | |
| 5,383,154 A | * 1/1995 | Shibuya | |
| 5,574,922 A | * 11/1996 | James | |
| 5,634,038 A | * 5/1997 | Saitoh | |
| 5,664,092 A | * 9/1997 | Waites | |
| 5,696,939 A | * 12/1997 | Iacobovici et al. | |
| 5,717,954 A | * 2/1998 | Grieff et al. | 710/52 |
| 5,764,932 A | * 6/1998 | Gochman et al. | |
| 5,872,980 A | * 2/1999 | Derrick et al. | |
| 5,895,493 A | * 4/1999 | Gatica | 711/147 |
| 5,951,662 A | * 9/1999 | Tissot | 710/107 |
| 6,018,785 A | * 1/2000 | Wenninger | 710/200 |
| 6,170,030 B1 | * 1/2001 | Bell | 709/231 |
| 6,282,195 B1 | * 8/2001 | Miller et al. | 370/392 |
| 6,286,074 B1 | * 9/2001 | Batchelor et al. | 710/129 |
| 6,374,329 B1 | * 4/2002 | McKinney et al. | 711/121 |

\* cited by examiner

*Primary Examiner*—Paul R. Myers
(74) *Attorney, Agent, or Firm*—Jeffrey S. Draeger

(57) ABSTRACT

A method and apparatus that may be used to obtain coherent accesses with posted writes. One method disclosed involves returning a semaphore indicator in an unlocked state and setting the semaphore indicator to a locked state in response to a semaphore indicator read when the semaphore indicator is in an unlocked state. A cycle for a target from a source is stored in an interface circuit, and the semaphore indicator is cleared to the unlocked state after the cycle completes to the target.

33 Claims, 5 Drawing Sheets

METHOD AND APPARATUS FOR OBTAINING COHERENT ACCESSES WITH POSTED WRITES FROM MULTIPLE SOFTWARE DRIVERS

BACKGROUND

1. Field of the Invention

The present invention pertains to the field of data transfer in a computer or other processing system. More particularly, the present invention pertains to obtaining coherent accesses to a target device when posted writes for the target device are used.

2. Description of Related Art

A posted write is a write cycle that is not immediately completed, but rather is stored in buffer circuitry for completion at a later time. Posting write cycles is often possible because data written to a storage location or a target device may not be needed immediately. Posting write cycles typically increases overall system efficiency because system resources may be used to perform cycles other than the write cycle. Thus, a new write posting technique may advantageously farther increase overall system efficiency.

One common prior art write posting technique is to use write buffers in a bus agent such as a microprocessor. The write buffers temporarily store write cycles that may otherwise be immediately generated by the bus agent. If such write buffers are used, the bus agent itself may redirect read cycles before write cycles posted in the write buffers so long as data coherency is maintained. Ensuring coherency typically involves ensuring that accesses to the same location are performed in the proper order so that stale data is not returned in the case of a read, and valid data is not overwritten by a rescheduled write. Thus, read cycles are often redirected around write cycles as long as the read cycles are to different locations than the write cycles. Eventually, however, the write cycle must be executed under normal conditions.

Once the bus agent begins execution of the write cycle, certain portions of the bus agent may be unable to perform other tasks for an indeterminate amount of time until the target device can respond. Using conventional write cycle techniques, a write cycle may tie up bus agent resources in several manners. Some bus agents may be unable to perform other bus transactions until the write cycle completes. In this case, a slow target device prevents the bus agent from performing other bus transactions and therefore degrades performance.

Alternatively, a bus agent may utilize split transactions such that multiple bus transactions may be pending on the bus simultaneously. Even in this case, however, there is a limit on the number of bus transactions that may be simultaneously pending. Therefore, a slow write cycle ties up resources that could be used for other bus transactions. Additionally, in some cases, a bus agent may only allow one pending cycle for certain types of cycles such as input/output (I/O) cycles. In this case, a slow I/O cycle not only limits the number of other cycles which are simultaneously executed, but also completely prevents other I/O cycles from occurring until the slow I/O cycle is completed.

Accordingly, a technique which may free resources otherwise utilized throughout transactions involving high latency (i.e., slow) target devices may be advantageous. While semaphore techniques are often used to maintain memory coherency in memories accessed by multiple devices, such techniques may not have been employed in the prior art to improve the efficiency of bus transactions. Additionally, semaphore techniques may not have been employed in a particular interface hardware arrangement to maintain data coherency in particular types of bus transactions such as I/O transactions involving high latency I/O devices.

SUMMARY

A method and apparatus that may be used to obtain coherent accesses with posted writes is disclosed. One method disclosed involves returning a semaphore indicator in an unlocked state and setting the semaphore indicator to a locked state in response to a semaphore indicator read when the semaphore indicator is in an unlocked state. A cycle for a target from a source is stored in an interface circuit, and the semaphore indicator is cleared to the unlocked state after the cycle completes to the target.

BRIEF DESCRIPTION OF THE FIGURES

The present invention is illustrated by way of example and not limitation in the figures of the accompanying drawings.

DETAILED DESCRIPTION

The following description provides a method and apparatus for obtaining coherent accesses with posted writes from multiple software drivers. In the following description, numerous specific details such as types of devices, types of bus cycles, and logic partitioning/integration choices are set forth in order to provide a more thorough understanding of the present invention. It will be appreciated, however, by one skilled in the art that the invention may be practiced without such specific details. In other instances, control structures and gate level circuits have not been shown in detail in order not to obscure the invention. Those of ordinary skill in the art, with the included descriptions, will be able to implement the necessary logic circuits without undue experimentation.

The disclosed techniques for performing device accesses may advantageously use a semaphore indicator to maintain data coherency while allowing multiple sources to access a particular target. The disclosed techniques may also free system resources by returning a signal to a source indicating that the write has completed after the write has been posted but before the write has completed to the target. Accordingly, source device resources otherwise used to buffer the write cycle may be freed for other cycles. Such a technique may be particularly advantageous where a target device is a relatively high latency device (compared to other system components) that would otherwise tie up such source device resources for a relatively long time.

Figure 1:
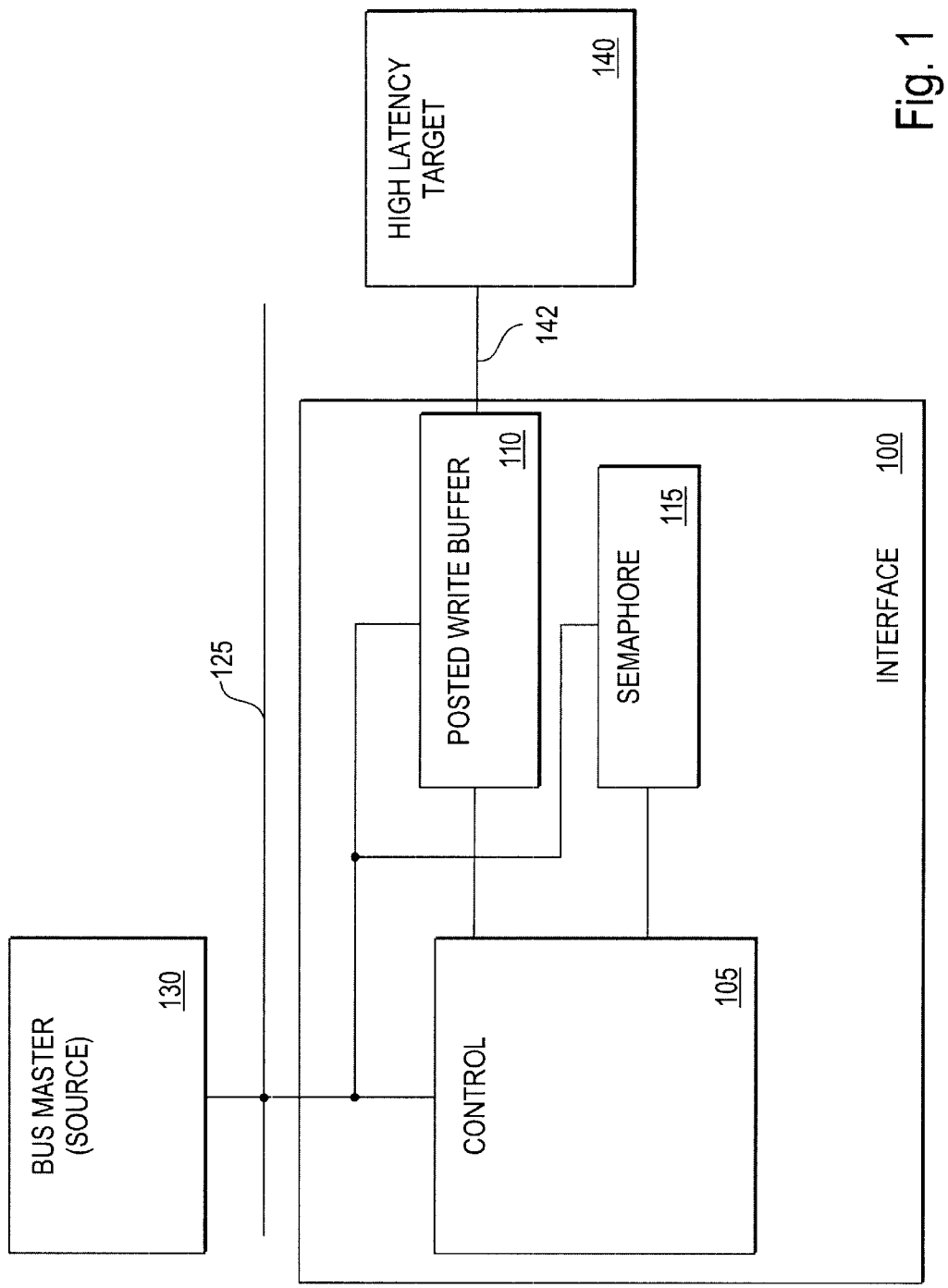
FIG. 1 illustrates one embodiment of a system utilizing an interface circuit to post write cycles from a bus master to a target device.

FIG. 1 illustrates one embodiment of a system which uses a semaphore to allow posting of writes from a source, bus master 130, to a high latency target 140. In this system, the bus master 130 is coupled to a bus 125 and coupled to an interface circuit 100. The interface circuit 100 includes a posted write buffer 110, a semaphore indicator 115, and a control circuit 105. Notably, in some embodiments, the interface 100 and the target 140 may be integrated into a single device, and/or multiple target devices may be present.

The interface circuit 100 is coupled to the target 140 by a bus 142. The bus 142 may be a bus such as the AC '97 link detailed in the AC '97 Specification, Revision 1.01, Sep. 10, 1998, published by Intel corporation of Santa Clara, Calif. Alternatively, the bus 142 may be a bus such as the peripheral components interconnect (PCI) bus. For example, a high latency PCI device may be improved by adding a buffer for posting writes and a semaphore mechanism according to disclosed techniques. By doing so, the PCI device may effectively limit its maximum cycle latency.

The bus master 130 is capable of generating a read or a write cycle to access the target 140. Prior to performing an access to the target 140, the bus master 130 tests the semaphore indicator 115 and postpones the access to the target 140 if the semaphore indicator 115 is in a locked state. The bus master 130 may perform such tests according to software routines executed by the bus master 130 or according to logic circuits in the bus master 130.

In response to the bus master 130 reading the semaphore indicator 115, the control circuit 105 returns an indication that the semaphore is locked if the semaphore indicator is in a locked state. If the semaphore indicator is in an unlocked state, the control circuit 105 performs a read-set operation which returns the unlocked state to the bus master 130 in response to the read and also sets the semaphore indicator 115 to the locked state. The read-set operation may be an atomic operation to simplify tracking of which of multiple devices or multiple processes set the semaphore.

If the access from the bus agent 130 is a write access, the bus agent 130 writes its data to the interface 100 which posts the cycle to the posted write buffer 110. The control circuit 105 may return a signal indicating that the write cycle is complete to the bus agent, thereby freeing bus agent resources for other cycles. The write cycle, however, may still be in the posted write buffer 110 and may not have completed to the target 140.

If the target 140 is accessed again (by either a read or a write cycle), the semaphore indicator indicates the locked state, therefore the access is postponed. When the write posted in the buffer 110 completes to the target 140, the control logic 105 automatically resets the semaphore indicator 115, allowing postponed accesses to proceed. Thus, when additional accesses to the target 140 occur prior to completion of a prior access, such accesses may be postponed as may have been the case in prior art systems which do not post such writes. In cases where additional accesses of this particular type do not occur prior to the completion of the write cycle to the target, however, resources in the bus agent 130 may be freed more rapidly since the interface 100 may hide the latency of the target device 140. In contrast, if write posting were only performed at the source, some source resources may be occupied for the entire duration of the write cycle.

In some embodiments, multiple posting buffers may be used. If multiple buffers are used, a semaphore indicator for writes may be set when all buffers are filled. Coherency between the multiple buffers may need to be maintained. For example, all reads may be blocked, or alternatively circuitry may compare read locations to pending write locations, depending on the type of target device involved, the nature of the accesses, and the amount of additional circuitry desired.

Figure 2:
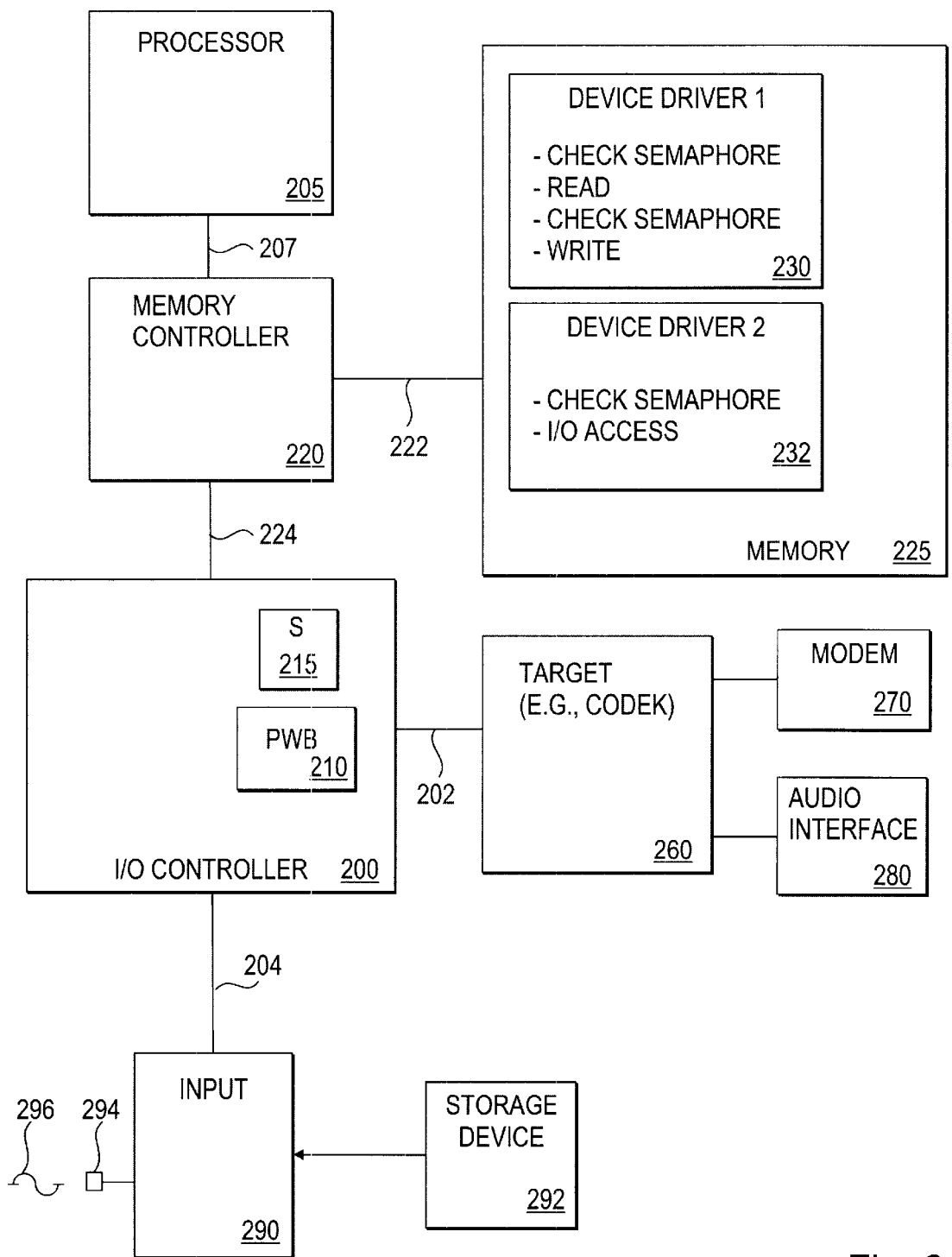
FIG. 2 illustrates one embodiment of a system having multiple device drivers that check a semaphore indicator prior to performing I/O accesses.

FIG. 2 illustrates another embodiment of a system utilizing a semaphore to allow posted accesses to a target device. In the system of FIG. 2, a processor 205 is coupled to a memory controller 220 by a bus 207. The memory controller 220 is coupled to a memory 225 by a bus 222. The memory controller 220 is also coupled to an I/O controller 200 by another bus 224. The I/O controller 200 includes a semaphore indicator (S) 215, and a posted write buffer (PWB) 210.

The I/O controller 200 is coupled to a target device 260, which in one embodiment may be a coder-decoder (CODEC) circuit. Additionally, a modem 270 and an audio interface, 280 may be coupled to the CODEC. The memory 225 may contain a first device driver 230 and a second device driver 232 which may be loaded into memory via an input device 290. For example, the input device 290 may load computer program instructions from any known or available computer instruction storage or transmission medium.

In the embodiment illustrated in FIG. 2, the input device 290 may either accept program instructions from a computer storage device 292 (e.g., a hard drive, an optical or magnetic disk or other storage device) or from a network or communications interface 294. Consequently, device driver code (i.e., computer instructions) causing the system to implement disclosed techniques may be programmed into the memory 225 in several ways. The device driver may be installed when the system is manufactured or may be later delivered via a computer readable medium through the input device 290.

In cases where the device driver is later delivered, either an electronic signal or a tangible carrier may be the computer readable medium. For example, the computer storage device 292 is the computer readable medium in one embodiment. A carrier wave 296 carrying the computer instruction is the computer readable medium in another embodiment. The carrier wave 296 may be modulated or otherwise manipulated to contain instructions that can be decoded by the input device 290 using known or otherwise available communication techniques. For example, a device driver program (e.g., an upgrade or later version of a device driver) may be transmitted over the Internet.

Figure 3:
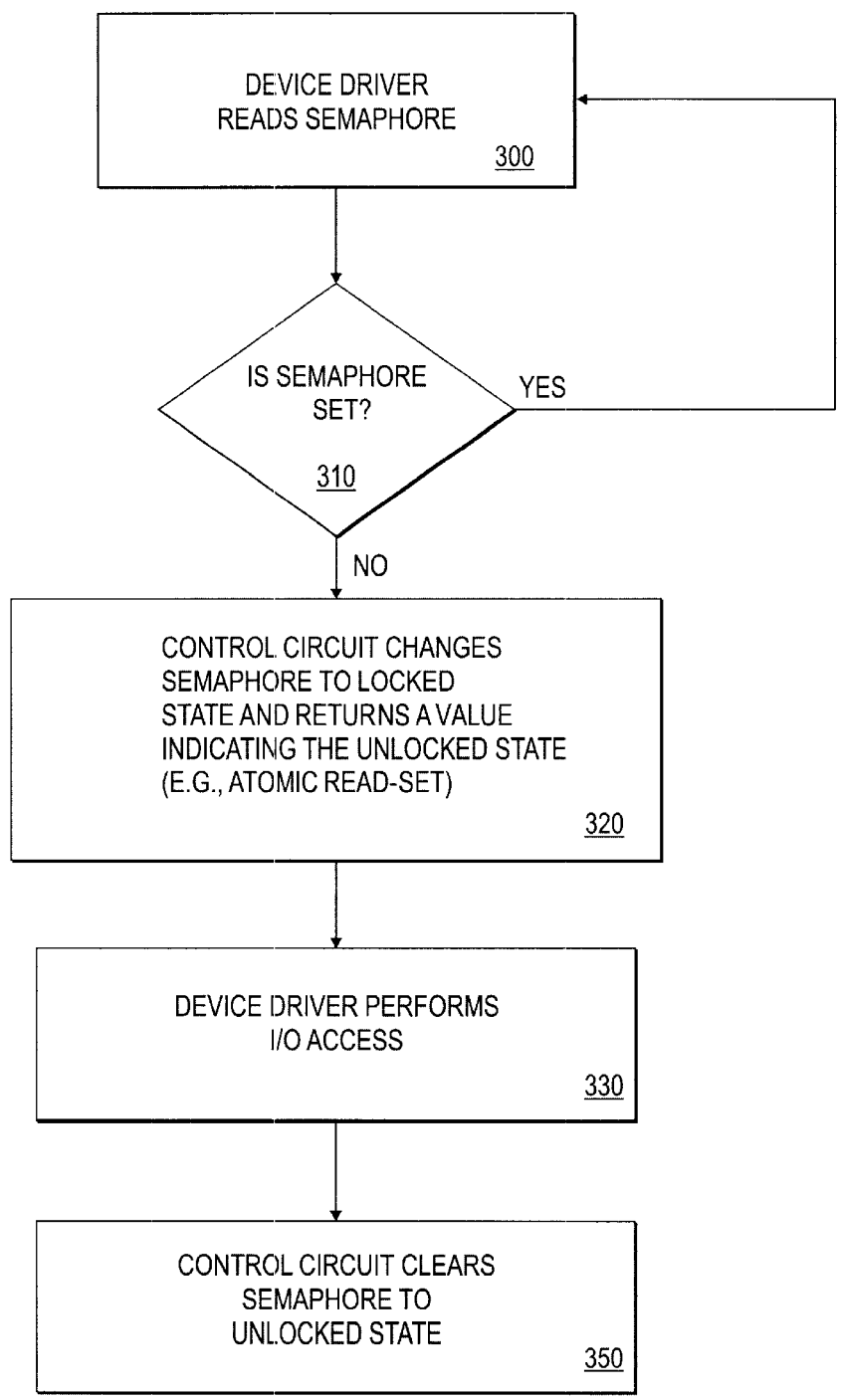
FIG. 3 is a flow diagram for operation of one embodiment of the system of FIG. 2.

FIG. 3 illustrates the flow of operation for one embodiment of the system of FIG. 2. In this embodiment, the semaphore indicator 215 is used to control processor I/O accesses to a CODEC. In block 300, a device driver reads the semaphore indicator 215. Either the device driver 230 or the device driver 232 may perform this operation when called by an application or other program. If the semaphore indicator is set to the locked state (e.g., a bit set to a one), as tested in block 310, the driver returns to block 300 where the semaphore indicator 215 is read again. Thus, if the semaphore indicator 215 is set, the device driver does not perform an I/O access.

If the semaphore indicator 215 is in an unlocked state (e.g., the bit is cleared to a zero), then the I/O controller 200 sets the semaphore indicator to the locked state and returns a value indicating the unlocked state to the device driver as shown in block 320. In some embodiments, this is performed by the I/O controller 200 as an atomic read-set operation. Since the device driver has obtained the access privilege to the CODEC in block 320, the device driver may then perform its I/O access as indicated in block 330.

Figure 4:
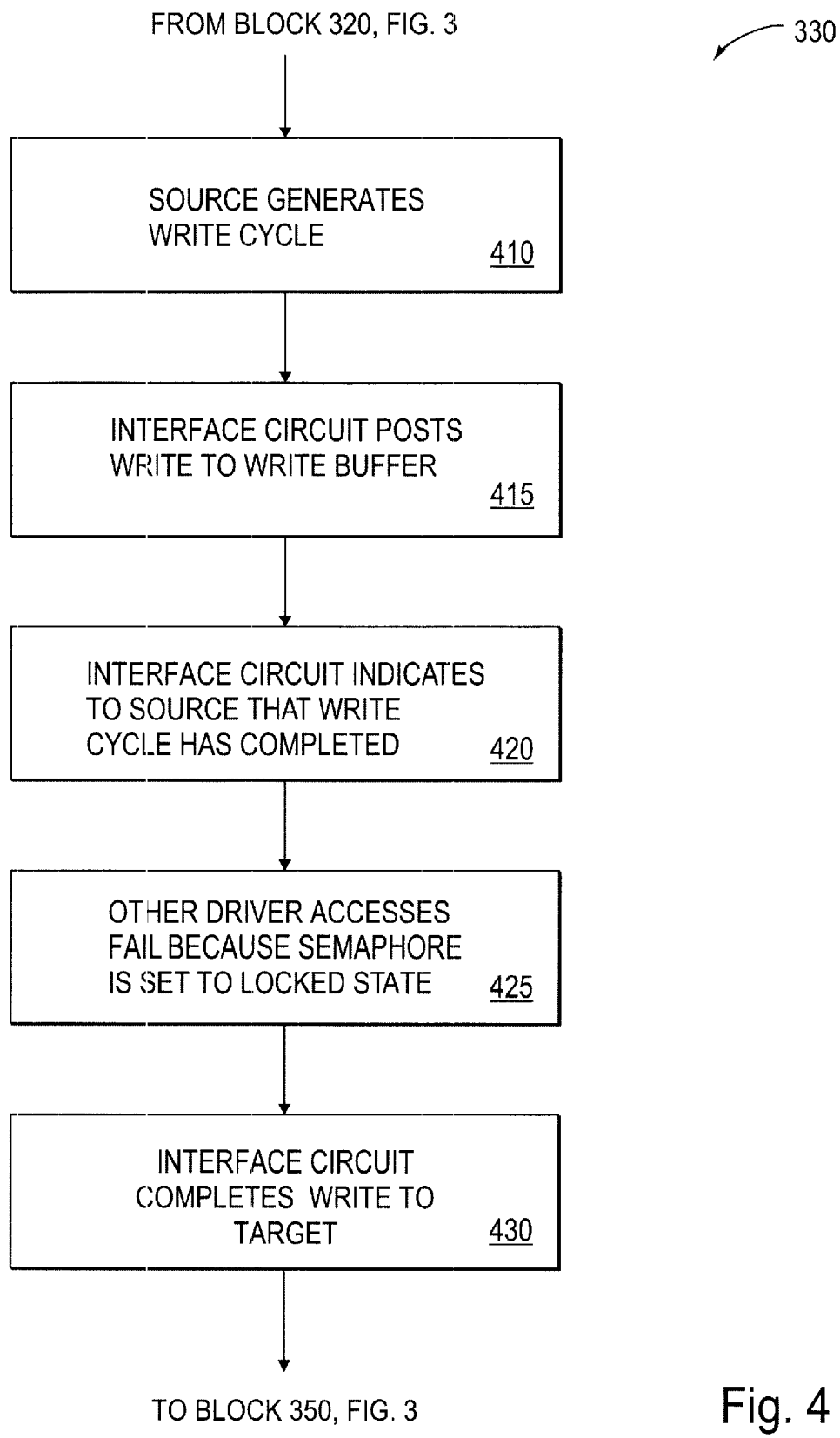
FIG. 4 is a flow diagram illustrating a write access as performed by one embodiment in block 330 of FIG. 3.

The operations involved in performing an I/O write access for one embodiment are shown in FIG. 4. In this embodiment, the source (e.g., the processor 205) generates an I/O write cycle as indicated in block 410. The interface circuit (e.g., the 110 controller 200) then posts the write to the posted write buffer 210 as indicated in block 415.

If, as indicated in block 425, another driver attempts to access the CODEC, then the access fails (e.g., the other driver may remain looping between blocks 300 and 310 in FIG. 3) because the semaphore indicator 215 is in the locked state. Thus, for example, if the second driver 232 is a modem driver for the modem 270 and attempts to access the CODEC while the driver 230 (an audio driver) is sending control information to the audio interface 280, the modem driver may not gain access to the CODEC until the audio driver information is written from the posted write buffer 210 to the CODEC.

If no accesses to the CODEC occur while the semaphore indicator 215 is in the locked state, a substantial improvement in efficiency may be obtained. For example, if the processor writes control information to the audio interface 280 via an I/O write, keeping that I/O write transaction open (i.e., not using write posting) may prevent the processor from performing some other transaction(s) while the I/O write transaction is open. If the write is posted to the write posting buffer 210 and the processor is promptly informed that the write has completed, the processor is free to perform I/O cycles to other devices in the system. If other I/O cycles accessing the CODEC do not immediately follow, the relatively large latency of the CODEC may be at least partially masked from the processor.

Whether or not any other accesses are attempted during the completion of the I/O access, the I/O controller 200 eventually completes the I/O write to the target device 260 as indicated in block 430. Returning to FIG. 3, the I/O controller 200 then clears the semaphore indicator 215 to indicate the unlocked state as shown in block 350. Thereafter, the same device driver or other device drivers may send I/O writes to the CODEC.

Figure 5:
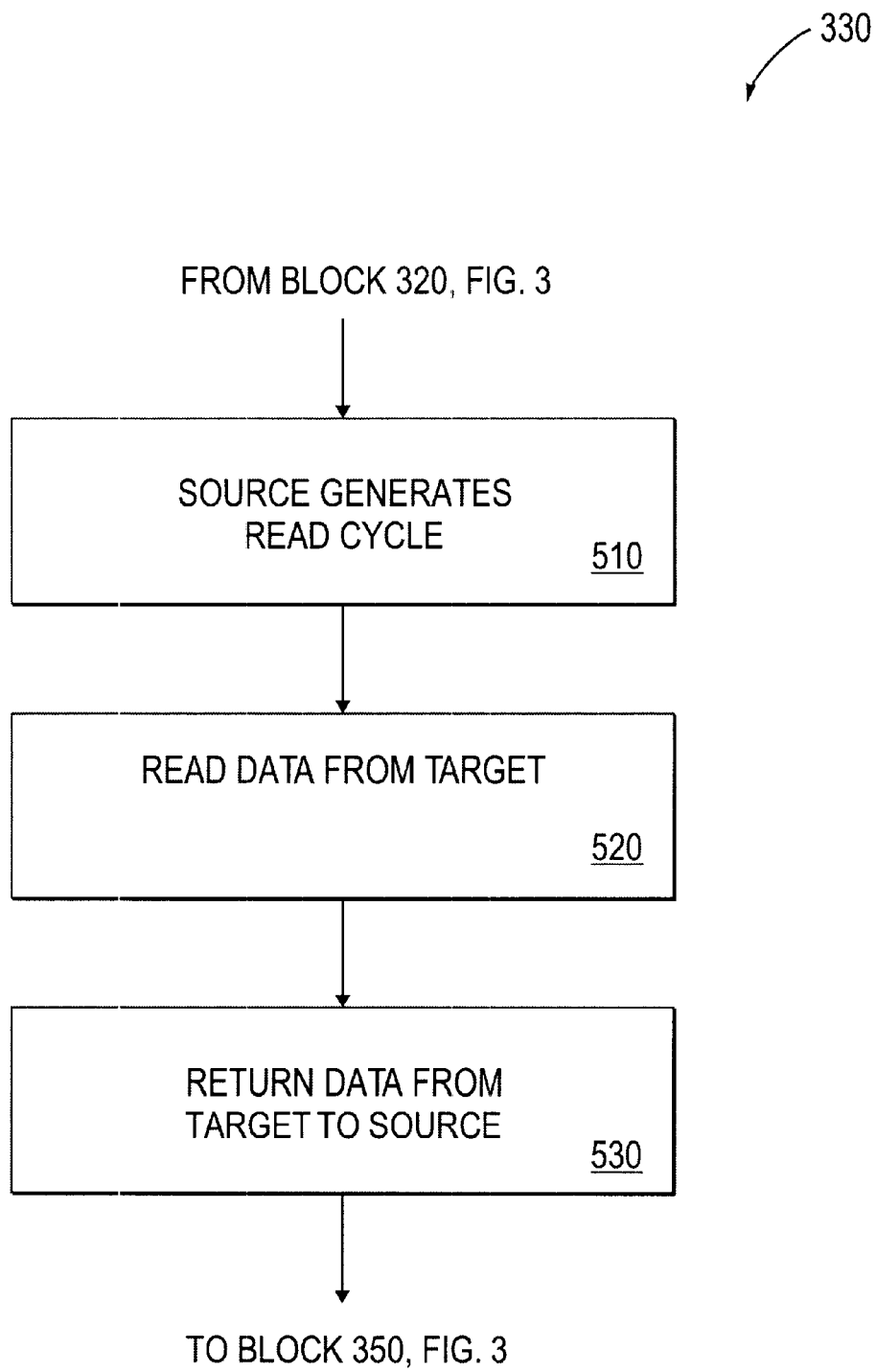
FIG. 5 is a flow diagram illustrating a read access as performed by one embodiment in block 330 of FIG. 3.

FIG. 5 illustrates operations that occur in one embodiment when the I/O access indicated in block 330 of FIG. 3 is an 110 read operation. As indicated in block 510, the source (e.g., the processor 205) generates a read cycle. Thereafter, the I/O controller 200 reads data from the target 260 as indicated in block 520. Data is returned from the target to the source as indicated in block 530, and thereafter the semaphore is released (the semaphore indicator 215 is cleared to the unlocked state) as indicated in block 350 in FIG. 3.

In some embodiments in which the operating system is a multi-threaded operating system, the presence of a single semaphore indicator may be particularly useful. In such a multi-threaded operating system, different threads may not be able to access the same I/O space. Therefore, it may be difficult for separate threads to coordinate I/O accesses. Embodiments using a separate hardware semaphore indicator may overcome this difficulty and allow multiple drivers to access a single target that may be unavailable.

Thus, a method and apparatus for obtaining coherent accesses with posted writes from multiple software drivers is disclosed. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed is:

1. A method comprising:
    storing a cycle for a target from a source in an interface circuit;
    returning a signal to the source indicating that the cycle has completed after the cycle has been stored in the interface circuit but before the target has received the cycle;
    clearing a semaphore indicator to an unlocked state in conjunction with a second cycle being generated to the target.

2. The method of claim 1 wherein said cycle is an I/O write cycle, said method further comprising buffering said I/O write cycle in a write buffer.

3. The method of claim 1 further comprising returning said semaphore indicator in said unlocked state and setting the semaphore indicator to a locked state by performing a read-set operation in response to a read request, the read-set operation automatically setting the semaphore indicator to said locked state if said semaphore indicator is in said unlocked state.

4. The method of claim 3, before returning the semaphore indicator in said unlocked state, further comprising:
    reading said semaphore indicator until said semaphore indicator is in said unlocked state prior to storing said cycle in said interface circuit.

5. The method of claim 1 wherein said cycle is a write cycle and the method further comprises:
    buffering said write cycle in a write buffer;
    wherein returning the signal to the source comprises indicating that said write cycle is complete to said source prior to writing data associated with said cycle to said target.

6. The method of claim 5 further comprising:
    writing data associated with said cycle to said target; and
    wherein clearing the semaphore indicator comprises setting said semaphore indicator to said unlocked state after writing data associated with said cycle to the target.

7. The method of claim 1, before storing the cycle, further comprising:
    polling said semaphore indicator until a lock is obtained.

8. The method of claim 1 further comprising:
    returning the semaphore indicator in the unlocked state and setting said semaphore indicator to a locked state in response to a semaphore indicator read if said semaphore indicator is in said unlocked state.

9. An apparatus comprising:
    a write buffer comprising at least one buffer;
    a control circuit coupled to return a semaphore indicator in an unlocked state and to set said semaphore indicator to indicate a locked semaphore state in response to a semaphore indicator read if said semaphore indicator indicates an unlocked semaphore state, the control circuit also being coupled to set said semaphore indicator to said unlocked state when a buffer in said write buffer is emptied.

10. The apparatus of claim 9 wherein said control circuit is to, responsive to a first bus cycle received on a first bus interface indicating a write cycle, generate a second bus cycle indicating said write cycle on a second bus interface, and wherein said control circuit is to generate a transaction completion indicator on said first bus interface prior to completion of said second bus cycle.

11. The apparatus of claim 9 wherein said write buffer is coupled to receive an I/O write cycle from a processor and wherein said control circuit is coupled to return a signal indicating that said I/O write cycle has completed when data from said I/O write cycle is stored in said write buffer.

12. The apparatus of claim 11 wherein said control circuit is further coupled to generate a write cycle for a target device in response to said I/O write cycle and to set said semaphore indicator to said unlocked state when said write cycle for said target device completes.

13. The apparatus of claim 9 further comprising:
a storage location to store said semaphore indicator, said storage location being integral with said write buffer and said control circuit, wherein said control circuit performs atomic read-set operations in response to a read cycle directed to a location corresponding to said semaphore indicator.

14. The apparatus of claim 9 wherein said semaphore indicator is to be set by a software routine and to be cleared by hardware in conjunction with performing a bus transaction.

15. The apparatus of claim 9 wherein said semaphore indicator is to be set by a read cycle to said apparatus and to be cleared by said apparatus in conjunction with said apparatus performing a bus transaction.

16. The apparatus of claim 9 wherein said write buffer has only one buffer and therefore the semaphore indicator is set to said unlocked state when said write buffer is emptied.

17. A system comprising:
a device;
an interface circuit coupled to transfer data to said device, the interface circuit having a write buffer and a semaphore indicator to indicate availability of said device, said interface circuit to return a completion signal in response to a write cycle after posting said write cycle in said write buffer and prior to completing said write cycle to said device, said interface circuit to maintain said semaphore indicator in a locked state until said write buffer is emptied and to clear said semaphore indicator in response to a buffer of the write buffer being emptied;
a bus agent coupled to said interface circuit capable of generating the write cycle for said device, the bus agent being coupled to cause said system to test the semaphore indicator and to postpone accesses to said write buffer if said semaphore indicator indicates the locked state.

18. The system of claim 17 wherein said bus agent is a processor and wherein the system further comprises:
a memory containing a device driver program which, if executed by the system, causes the system to test the semaphore indicator and to postpone accesses to said device if said semaphore indicator indicates said locked state.

19. The system of claim 18 wherein said memory contains a plurality of device driver programs, each of which, if executed by the system, causes the system to test the semaphore indicator and to postpone accesses to said device if said semaphore indicator indicates said locked state.

20. The system of claim 18 wherein said interface circuit further comprises a control circuit coupled to return said semaphore indicator in an unlocked state and to set said semaphore indicator to indicate a locked semaphore state in response to a semaphore indicator read if said semaphore indicator indicates an unlocked semaphore state.

21. The system of claim 20 wherein the control circuit is also coupled to set said semaphore indicator to said unlocked state when said write buffer is emptied.

22. The system of claim 21 wherein said control circuit is also coupled to return a signal indicating said write cycle is completed to the bus agent when data for said write cycle is stored in said write buffer.

23. A system comprising:
a processor capable of generating a write cycle;
an interface circuit comprising:
a write buffer coupled to receive said write cycle;
a semaphore indicator; and
a control circuit, the control circuit being coupled to return a state of said semaphore indicator in response to a semaphore read and to set said semaphore indicator to a locked state in response to the semaphore read if the semaphore is in an unlocked state, the control circuit also being coupled to set said semaphore indicator to said unlocked state when said write buffer is emptied.

24. The system of claim 23 further comprising:
a device coupled to said interface circuit to receive data from said write buffer.

25. The system of claim 24 wherein said device is a high latency device and wherein said write cycle is an input/output (I/O) write cycle.

26. The system of claim 24 further comprising:
a memory containing a device driver for said device, said device driver, if executed by the processor, causing the system to perform:
testing whether said semaphore indicator is set to said unlocked state; and
postponing an access to said device until said semaphore indicator is set to said unlocked state if said semaphore indicator is in said locked state.

27. An article comprising a machine readable medium having stored thereon instructions which, if executed by a machine, cause the machine to perform:
reading a semaphore indicator for a target;
generating a cycle for said target from a source if said semaphore indicator was in an unlocked state when read, said cycle being generated by said source to an interface circuit;
storing said cycle in the interface circuit;
generating a second cycle from said interface circuit to said target;
maintaining said semaphore indicator in a locked state until said second cycle is generated;
clearing said semaphore indicator to said unlocked state after said cycle to said target is generated.

28. The article of claim 27 wherein said instructions further cause said machine to perform:
reading said semaphore indicator until said semaphore indicator is in said unlocked state prior to sending said cycle to said interface circuit.

29. The article of claim 28 wherein said cycle is a write cycle and wherein instructions further cause said machine to perform:
buffering said write cycle in a write buffer;
indicating that said write cycle is complete to said source prior to writing data associated with said cycle to said target;
writing data associated with said cycle to said target; and
setting said semaphore indicator to said unlocked state after writing said data associated with said cycle to said target.

30. A system comprising:

an I/O bus;

an I/O device coupled to said I/O bus;

a processor bus;

a processor capable of generating a processor bus transaction indicating a write cycle for said I/O device;

a bus bridge circuit coupling said processor bus to said I/O bus, said bus bridge circuit to generate an I/O bus transaction indicating said write cycle to said I/O device in response to the processor bus transaction indicating the write cycle for said I/O device, said bus bridge circuit to generate a transaction completion indicator to said processor prior to completion of said I/O bus cycle, said bus bridge circuit comprising:
- a write buffer to buffer said write cycle, said write buffer comprising at least one buffer;
- a storage location integral to said bus bridge circuit, said storage location to store a semaphore indicator dedicated to indicating availability of said I/O device;
- a control circuit to return a state of said semaphore indicator in response to a semaphore read and to set said semaphore indicator to a locked state in response to the semaphore read if the semaphore indicator indicates an unlocked state, the control circuit also to set said semaphore indicator to said unlocked state in response to a buffer becoming available in said write buffer.

31. The system of claim 30 further comprising a device driver to test said semaphore indicator and to obtain a lock before generating an access to said I/O device.

32. A method comprising:

obtaining a semaphore prior to generating an access to an I/O device;

generating the access to the I/O device;

if the access is an I/O write, then
- posting said I/O write to a write buffer in a bridge component;
- returning a cycle indicating completion of said I/O write;
- generating a second cycle to provide said I/O write to said I/O device after returning the cycle indicating completion of said I/O write;
- clearing said semaphore in response to said second cycle.

33. The method of claim 32 further comprising:

if the access is an I/O read, then
- performing said I/O read of an item from said I/O device;
- returning said item;
- returning a cycle indicating completion of said I/O read after performing said I/O read of said I/O device and returning the item.

* * * * *

UNITED STATES PATENT AND TRADEMARK OFFICE
CERTIFICATE OF CORRECTION

PATENT NO. : 6,453,375 B1
DATED : September 17, 2002
INVENTOR(S) : Derr et al.

It is certified that error appears in the above-identified patent and that said Letters Patent is hereby corrected as shown below:

Column 1,
Line 23, delete "farther", insert -- further --.

Column 5,
Lines 2 and 41, delete "110", insert -- I/O --.

Signed and Sealed this

Eighteenth Day of February, 2003

JAMES E. ROGAN
*Director of the United States Patent and Trademark Office*